(12) United States Patent
Einarsson et al.

(10) Patent No.: US 8,340,113 B2
(45) Date of Patent: Dec. 25, 2012

(54) METHOD AND ARRANGEMENT FOR IMPROVED MEDIA SESSION MANAGEMENT

(75) Inventors: Torbjorn Einarsson, Stockholm (SE); Clinton Priddle, Upplands Vasby (SE)

(73) Assignee: Telefonaktiebolaget LM Erricsson (publ), Stockholm (SE)

( * ) Notice: Subject to any disclaimer, the term of this patent is extended or adjusted under 35 U.S.C. 154(b) by 439 days.

(21) Appl. No.: 12/665,594

(22) PCT Filed: Aug. 9, 2007

(86) PCT No.: PCT/SE2007/000719
§ 371 (c)(1),
(2), (4) Date: Dec. 18, 2009

(87) PCT Pub. No.: WO2008/156390
PCT Pub. Date: Dec. 24, 2008

(65) Prior Publication Data
US 2010/0189124 A1    Jul. 29, 2010

Related U.S. Application Data

(60) Provisional application No. 60/929,289, filed on Jun. 20, 2007.

(51) Int. Cl.
*H04L 12/28* (2006.01)
*H04J 3/24* (2006.01)
*H04N 7/14* (2006.01)

(52) U.S. Cl. .................. 370/431; 370/473; 348/14.02; 725/38

(58) Field of Classification Search .............. 370/328, 370/329, 431, 432, 466, 473; 348/14.01, 348/14.02; 725/37, 38, 59, 62
See application file for complete search history.

(56) References Cited

U.S. PATENT DOCUMENTS

| 7,886,073 | B2* | 2/2011 | Gahm et al. ............... 709/231 |
| 7,986,702 | B1* | 7/2011 | Reister ....................... 370/401 |
| 2005/0190781 | A1 | 9/2005 | Green et al. |
| 2005/0254526 | A1 | 11/2005 | Wang et al. |
| 2007/0171942 | A1 | 7/2007 | Quinard |
| 2008/0267210 | A1* | 10/2008 | Sidana ........................ 370/449 |
| 2010/0091772 | A1* | 4/2010 | Cedervall et al. .......... 370/392 |

FOREIGN PATENT DOCUMENTS

| EP | 1523190 A1 | 4/2005 |
| EP | 1670252 A2 | 6/2006 |
| WO | 2006/057606 A1 | 6/2006 |
| WO | 2007/149029 A1 | 12/2007 |

OTHER PUBLICATIONS

Einarsson, T. et al. "Multiple Aggregated Control URIs for RTSP." Internet Engineering Task Force, Network Working Group, Internet-Draft, Intended status: Standards Track, Dec. 21, 2006.

* cited by examiner

*Primary Examiner* — Kerri Rose
(74) *Attorney, Agent, or Firm* — Coats & Bennett, P.L.L.C.

(57) ABSTRACT

In a method for media session management a user terminal upon detecting S0, S00 switching to a media stream on a channel from a unicast transport source, requesting S1 transmission of the media stream by indicating a predetermined starting frame for the transmission and a media server transmitting S2 the requested media frame starting with a media frame as indicated in the request.

27 Claims, 8 Drawing Sheets

METHOD AND ARRANGEMENT FOR IMPROVED MEDIA SESSION MANAGEMENT

TECHNICAL FIELD

The present invention relates to telecommunication systems in general, specifically to improved unicast media session management in such systems.

BACKGROUND

It has become a trend to offer and provide a vast range of new services in existing mobile networks and mobile communications systems. There is currently a very big interest in using mobile networks for multimedia or TV content. This is often referred to as Mobile-TV in the art. The goal for Mobile-TV applications is to offer a TV-like experience where the user can choose and easily zap between different multimedia or TV channels.

Ordinary TV channels are broadcasted to many users and typically the user can choose which channel to receive and view. Mobile-TV is similarly about delivering a set of (live) media or multimedia streams to several end-users. Each multimedia stream corresponds to a TV-channel, and each user shall be able to choose which channel to view. At the moment, broadcast/multicast delivery methods for Mobile-TV are under development. Examples of such standardisation efforts are 3GPP Multimedia Broadcast/Multicast Services (MBMS) and European Telecommunications Standards Institute (ETSI) Digital Video broadcasting-Handheld (DVB-H). These will be similar to traditional TV, in their broadcast distribution fashion.

IPTV (Internet Protocol TV) is a term used when delivering broadcasted TV-services over an IP network, typically a broadcast access network. In addition, more personalized service can be delivered due to the flexible nature of an IP network, e.g. video-on-demand or other user specific service, which then are delivered over unicast IP streams to the end user. IP video systems are becoming a key feature in service providers triple play offerings towards residential and business customers. Offering acceptable channel switching time with reasonable picture quality is essential for customers adoption. The problem maps directly into keeping low delays both in the customer premises and within the network.

To begin decoding and constructing an image from the video stream a lot of information needs to be gathered from the stream, which only comes with a certain frequency. In particular, to start displaying the image of a new video feed, the decoder needs to wait for a Random Access Point (RAP) to arrives in the video stream, a so called Intraframe or I-frame for older video standards, or a so called IDR (Instantaneous Decoder Refresh) for H.264. Such frames are the only frames in the media stream that contain enough information on themselves to reconstruct a complete image. They typically come with a periodicity of 0.5 to 5 seconds, depending on the encoding type.

Existing solutions use a combination of pull mechanisms to obtain the last intraframe transmitted in the video transmission (HTTP GET or other) from the video server or the closest access node, or different mechanism to deliver slightly time-shifted video streams, so that the time distance to receiving an intraframe gets heavily reduced. These solutions imply that the channel switching mechanism will only be able to show a static image until the next intraframe arrives and the video decoding can continue or that your bandwidth consumption grows with the number of time-shifted streams that you are making available at the access node (DSLAM or equivalent). If the time shifting occurs in the access node itself, the requirements on processing power and capabilities of the multiplexing access node gets greatly enhanced.

With the emergence of MBMS (Multimedia Broadcast/Multicast Service [1]) and DVB-H (Digital Video Broadcasting-Handheld, [2]), Mobile TV, which, in the beginning was entirely unicast, will consist of a combination of unicast and broadcast channels. This adds a new channel switching requirement as one need not only be able to switch between channels, but even between different transport sources of the same channel.

Unicast channel switching has been developed during a long period of time and methods of fast channel switching are available. When switching into a live channel, the media decoders typically do not instantly get all the information required to display the first complete picture of the video stream. It is only when decoding an Intra picture, a.k.a. key frame or Random Access Point (RAP) that the decoder can display a full picture. A good way of getting a fast and distinct channel switch is therefore that the media server buffers the bitstream and sends a delayed stream starting with a RAP to the decoder. In the case where RTSP (Real Time Streaming Protocol, [3]) the basis of PSS (Packet-switched Streaming Service, [4]) in 3GPP SA4) is used, this buffering can be used both when a completely new RTSP session is set up, and when the channel is switched inside an existing RTSP session.

In the case of switching channel inside an RTSP session, the switch can be done inside ongoing RTP sessions, or by establishing new RTP sessions, but the issue and solution remain the same.

A seamless transition between unicast and broadcast can be relatively simply achieved by simultaneously receiving the two streams during a short period and switching between the sources at an appropriate point. If the streams are identical on the packet level, it can be done on any packet. If not, the new stream should start to be decoded at a RAP. A prerequisite for this to work is that the difference in arrival time between the channels is small.

If the server buffers the unicast channels on an individual level to start sending a RAP, this leads to a delay whose maximal value is the distance between RAPs.

When switching from, for example, broadcast to unicast, but within the same channel, a fast switch to a buffered version of the channel starting with a RAP is not desired as this can result in a buffer under run, which will prohibit so called seamless access transition. That is, seamless in a user perceived sense of the word.

Thus, there is a need for methods and arrangement for enabling seamless transition to unicast sessions.

SUMMARY

An object of the present invention is to enable improved media transmissions.

A further object of the present invention is to enable seamless user-perceived channel switching.

These and other objects of the present invention are described in the attached set of claims.

Basically, according to the present invention, a user terminal upon detecting S0, S00 switching to a media stream on a channel from a unicast transport source, requesting S1 transmission of the media stream by indicating a predetermined starting frame for the transmission and a media server transmitting S2 the requested media frame starting with a media frame as indicated in the request.

According to a specific embodiment, the request is comprised in a RTSP header and the starting frame is indicated by a starting parameter, e.g. Start-Position-Type parameter.

Advantages of the present invention include:

A user perceived seamless transition between a broadcast and unicast session.

Enabling a client to signal to a server where it wishes to start in a live unicast media stream.

An RTSP server can combine fast unicast channel switching with seamless broadcast to unicast transition or other access transition. This can be done on a server where each channel is encoded only once and the fast switching is performed using buffering.

The embodiment of the present invention where the indication of a starting frame is indicated by means of a new header in an existing message, enables servers that do not have the invention implemented to simply ignore the header. Thereby, the present invention provides a solution that does not have any backward compatibility issues.

BRIEF DESCRIPTION OF THE DRAWINGS

The invention, together with further objects and advantages thereof, may best be understood by making reference to the following description taken together with the accompanying drawings, in which.

ABBREVIATIONS

3GPP The 3$^{rd}$ Generation Partnership Project
DVB_H Digital Video Broadcasting-Handheld
FEC Forward Error Correction
IDR Instantaneous Decoder Refresh
MBMS Multimedia Broadcast/Multicast Service
NTP Network Time Protocol
NPT Normal Play Time
PSS Packet-switched Streaming Service
RAP Random Access Point
RTCP RTP Control Protocol
RTP Real-time Transport Protocol
RTSP Real Time Streaming Protocol

DETAILED DESCRIPTION

The present invention will be described in the context of a broadcast/unicast communication system capable of supporting Mobile TV services, especially using RTSP. However, it is evident that the invention can be applied to other systems where there is potentially a transition of user reception from broadcast to unicast transmissions or more generally, from non-buffered transmissions to buffered transmissions. Alternatively, the present invention can be applied in a situation where an entirely new media session is set up or where a user terminal switches from one channel on a unicast provider to another channel on the same unicast provider, e.g. within a same session.

Media or multimedia data according to the present invention includes any form and type of media that can be rendered and displayed at a user terminal. This includes, but is not limited, to images, video, audio and other media types that are capable of being perceived, during rendering, by a user. A media channel according to the present invention is a channel that can, for instance, carry "live" media or consist of pre-recorded content consisting of one or more clips.

Figure 1:
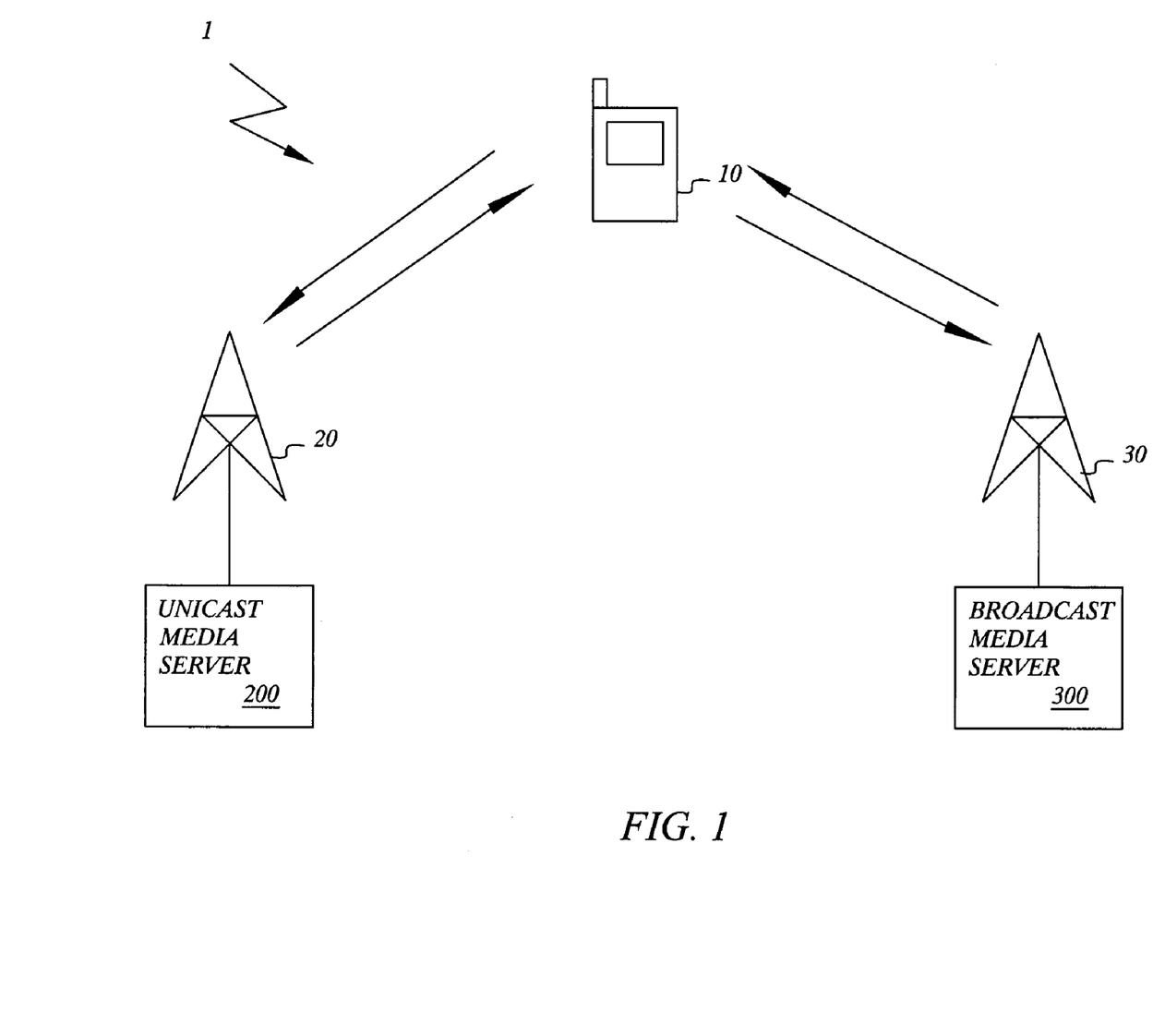
FIG. 1 illustrates a system in which the present invention can be implemented.

FIG. 1 illustrates schematically a wireless communications system 1 in which the present invention can be implemented. The communications system 1 comprises a base station or network node 20 capable of transmitting media content to at least one connected client or user terminal 10. This base station 20 comprises or is connected to a media server 200 of the invention having multiple available unicast-based media channels. Further, the system comprises a second base station or network node 30 capable of broadcasting media content to the user terminal 10 (and potentially to other user terminals as well).

Figure 2:
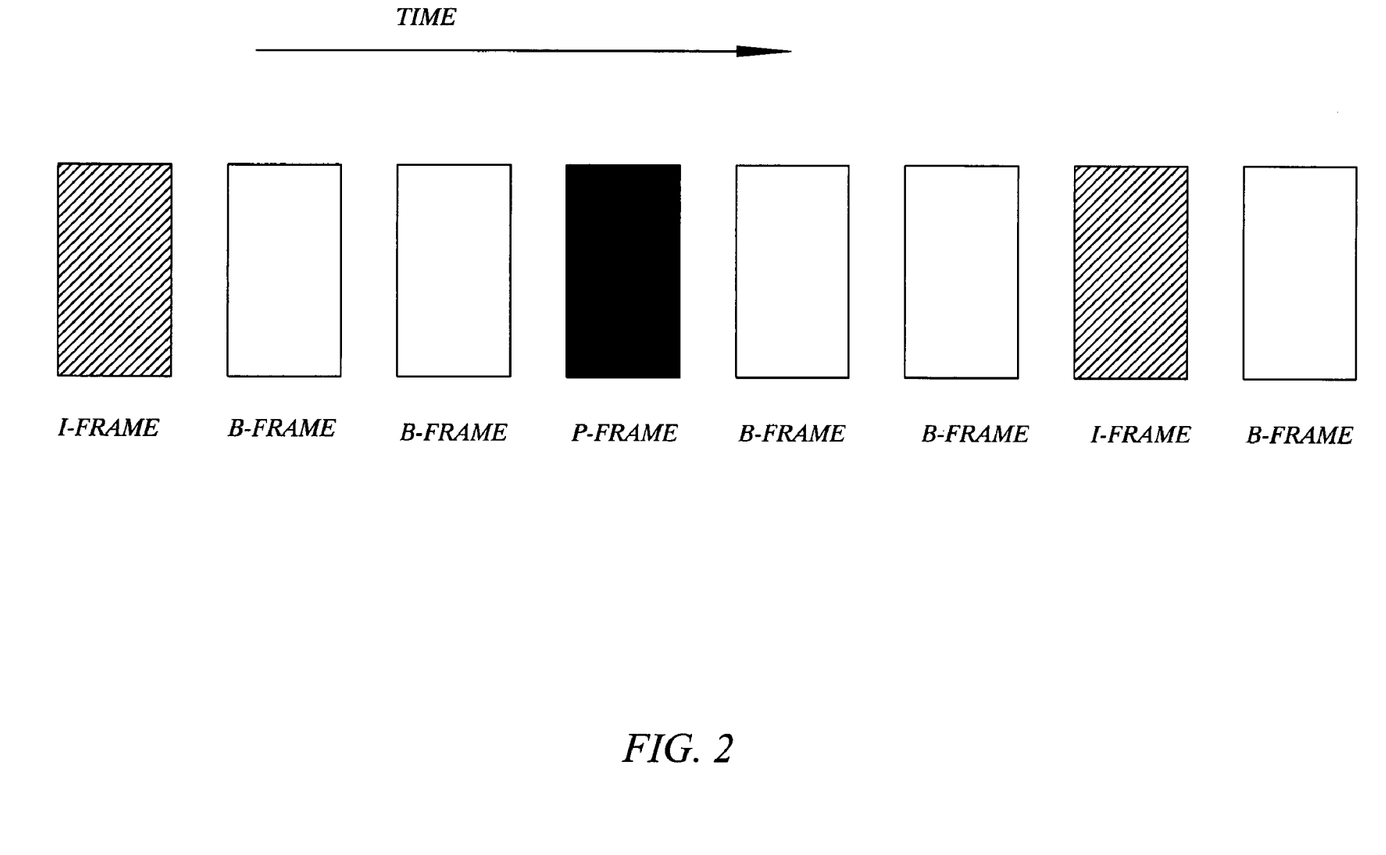
FIG. 2 illustrates the frames of a media stream.

As seen in the FIG. 2, for a MPEG-2 codec the media stream typically comprises various types of frames, P-frames, B-frames and Intraframes or key-frames, Intraframes are marked as "I-frame". The I-frame is the only frame where there is no reliance on previous or future frames for coding, an equivalent example of such a self-contained or key frame is the Random Access Point (RAP), where RAP is a general term for all types of media, and an I-frame is an example used in video. The coding is done on only the I-frame itself so there is only intraframe coding used. Thus, it useful when an error has been introduced in the frame sequence as it restores the correct frame again. The P-frame is coded using prediction of the previous P-frame or I-frame. This prediction is usually accomplished by means of motion compensation and motion predication. The last type of frame is the B-frame that is a frame that is coded by means of forward and backward prediction to I-frames and P-frames, or even an estimate of the in between value of them. This type of frame is susceptible to propagating errors but has the advantage of a low bitrate.

At present, there is no manner in which a client or user terminal can signal or inform a media server or transport source, by means of any known protocol e.g. RTSP, of a desired starting frame or position in the media stream. This is particularly a problem in so called hybrid unicast/broadcast solutions where a client is capable of receiving media streams from broadcast and/or unicast media servers. It is thus not possible for a client to inform a server, or for a server to gain information, that a switch or establishment of a unicast channel is due to switch in transport source (e.g. MBMS to unicast RTSP) of the same channel or if it is in fact a switch in content also.

The above-mentioned types of switches essentially determine where in the media stream a client or user terminal wishes to tune in. When switching from broadcast to a different unicast channel, a fast channel switch beginning with a key frame such as an intraframe or a RAP is desired. This fast switch can be achieved if a server buffers the media packets, thus providing a delay which enables more or less seamless switching. When switching to the same channel, but a different transport mechanism or source, this type of buffering is undesirable, since it would potentially result in transmission of an already transmitted RAP or other general media frame. Thus, preventing any seamless transition for the user or client terminal.

Basically, according to the invention, the client requests transmission of a media stream from a unicast transport source, said request including information of where in the media stream the transmission should start. This is achieved by the inclusion of a specific indication of a desired starting frame. According to a specific embodiment, this indication is included in the so called RTSP PLAY request or similar. Thereby the user can request a specific starting frame based on what type of switch it is experiencing.

A general embodiment of the present invention will be described with reference to FIG. 3.

In a most general embodiment of the present invention, a client or user terminal requests S1 transmission of at least one media stream from a unicast media server or provider by providing an indication of a starting position in the media stream for transmission. In response to this request and indication, the media server initiates transmission S2 of the requested media stream starting at the indicated frame.

The user terminal can request to receive media from the last key frame i.e. RAP, the instantaneous or live position, the next key frame, or at a specific point in time using a timeline e.g. NTP.

The steps of requesting transmission S1 and actually transmitting S2 the requested media frame starting from the indicated start frame can be preceded by further steps.

In a first step S0 a need for a switch is detected. This can be performed by actual measurements of reception conditions and be performed based on some quality of service measure, or some other measure related to radio conditions for the client, or merely a detection of an actual channel switch instigated at the client or user. The channel switch can be initiated base on input from a separate monitoring unit in the system, or by the user.

Subsequently, in a second step S00 a switch type is determined for the detected switch. This type is then decisive for which starting frame is to be indicated in the actual transmission request in step S1.

According to a specific embodiment of the present invention, a broad interpretation of the term channel switch covers the establishment of an entirely new session, or a channel switch within a same transport source (i.e. unicast). For those two cases the steps S0 and S00 could be viewed as optional.

Figure 4:
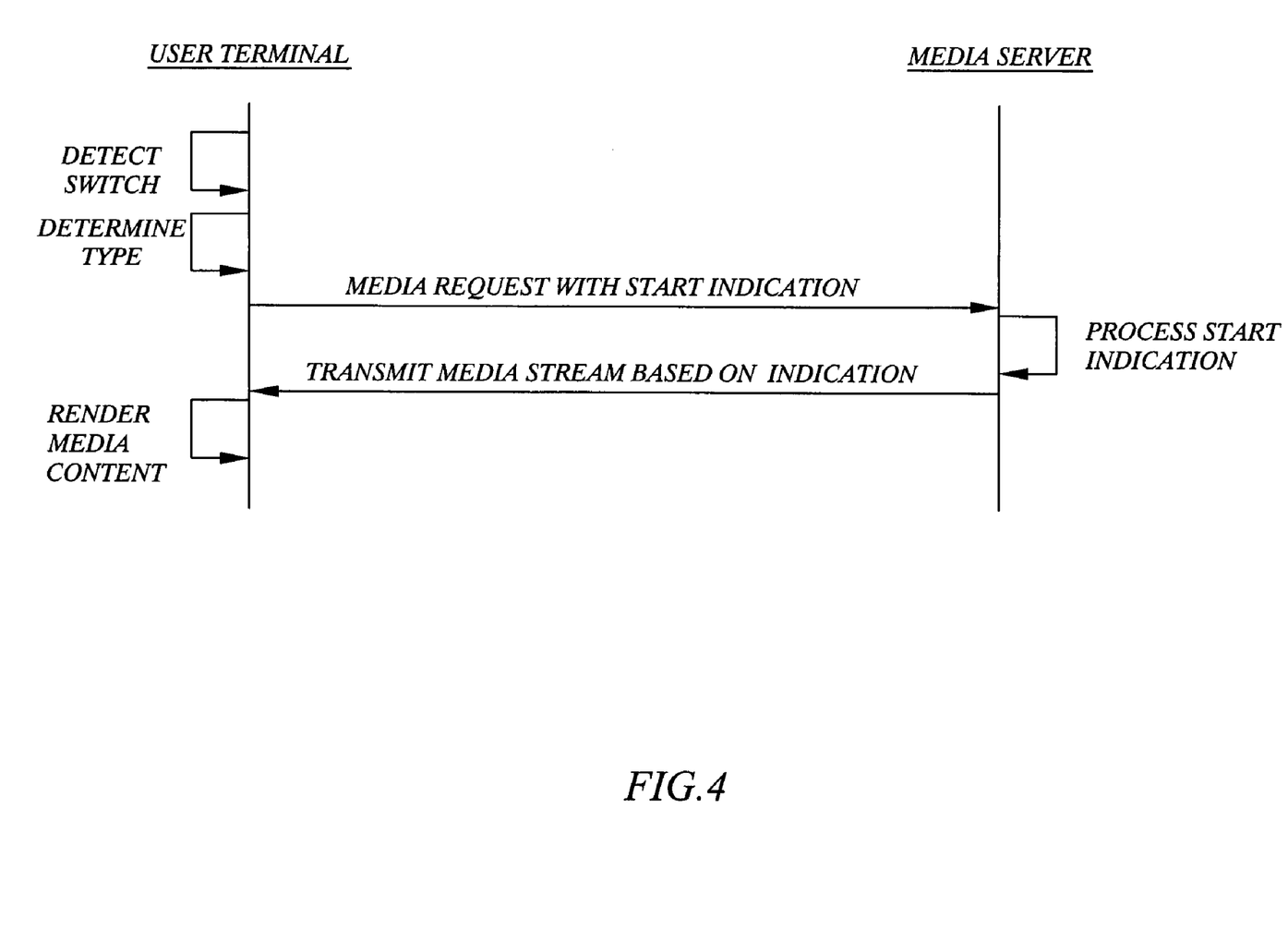
FIG. 4 illustrates a schematic signaling diagram of an embodiment of a method according to the invention.

An example of a signaling diagram between a user terminal and a media server of the above embodiment is illustrated in FIG. 4. A channel switch is detected at the user terminal. The term switch is used in a fairly broad meaning, including both an actual switch to a new channel and a switch between a channel on a broadcast server to the same channel on a unicast server. Subsequently, the type of switch is determined. In essence, is the switch an actual channel switch, or only a switch from a broadcast to unicast server. Also other types of "switching" are included, as well as switching in the sense of setting up a new session. Based on the determined switch type, the user terminal requests transmission of a media stream from the media server. The request includes an indication of where in the media stream the transmission should begin. The media server processes the request and subsequently transmits the media stream starting with a frame as indicated by the start frame indication. Finally, the user terminal can render the media, and the user has a seamless viewing experience.

When media is requested from a last key frame or RAP, the server should instantly start sending a delayed stream starting with the latest RAP. This is instantaneously available since it is buffered. The delay with respect to the non-buffered stream depends on the distance to the last RAP. Requests for instantaneous media shall result in non-buffered data that may or may not be a RAP. Finally, requests from the next RAP result in non-buffered data that is a RAP, but after a possible delay. The next RAP request is essentially very similar to the instantaneous media request—the difference is that all packets which are not part of a RAP are filtered out by the server. Finally, the indication of a specific point in time based on a timeline requires that all servers/nodes/user terminals are synchronized with a same clock.

The concept of RAP is mostly an issue for video media, but may also be relevant for other media. If multiple media are used, the server should define the RAP so that the content can be played as fast as possible.

According to known methods, when issuing an RTSP PLAY request, the client or user terminal defines the range in an RTSP header. This range is typically Range: 0-or Range: now-for live streams. For stored content, a specific NPT (media time) can be used instead. In both the live and stored cases, there is no possibility to tell whether the server should try to be exact in time or whether it should start sending from a nearest RAP.

According to a specific embodiment of the present invention, a new header is added to the current RTSP PLAY request. This header contains at least information pertaining the type of starting position, or potentially an indication of the switch type that preceded the switch.

As an example, consider a new header named Start-Position Type, with the format:

Start-Position Type: "instant"|"lastRAP"|"nextRAP"

For the switch or transmission type "instant", media is to be transmitted immediately without an extra delay and starting with the first available live media frame. Accordingly, non-buffered media frames should be transmitted.

For the type "lastRAP", media is to be transmitted immediately to the client, starting with the latest RAP buffered in the media server. There is no requirement for sending the media without an extra delay. Accordingly, buffered media frames should be transmitted, starting with the most recent buffered key frame.

For the type "nextRAP", media is to be transmitted starting with a next non-buffered key frame. Thus, there is no requirement for avoiding delay in the transmission. In practice this might result in only audio transmission until the first key frame is transmitted.

According to the above described embodiment, the request for a predetermined starting frame is included in the RTSP PLAY request, however it can also (or instead) be included in some other RTSP request, such as SET_PARAMETER or some future undefined RTSP request.

In the following a couple of example embodiments of the present invention will be described, suitably divided into matching descriptions of client or user terminal and server.

Example Client/User Terminal

Channel Switch Broadcast->Unicast, Same Channel

Upon a decision to switch from a media stream on a channel from a broadcast source to the same media stream and channel supplied via a unicast source, the client requests transmission of the media frames and indicates where in the media stream the transmission should start.

According to this example, the client sets and provides the Start-Position-Type parameter in the RTSP PLAY request to "nextRAP". In this way, the client is requesting a non-buffered unicast stream. The terminal can then listen to the broadcast and unicast streams during a short period simultaneously. Once the NTP to RTP-timestamp link of each stream is known, the client can synchronize the streams and switch to unicast on the first RAP.

If this channel switch is due to a loss of broadcast coverage, or if the client knows that the content is encoded in exactly the same way, it is not always advantageous to switch at a key frame. In these cases the Start-Position-Type parameter can be set to instant, i.e. request transmission of non-buffered media frames without introducing extra delay, and regardless of if the frame is a key frame or not.

In the case of an access switch where both streams are encoded in exactly the same way, so that there is a one-to-one correspondence between the packets, there is also no need to wait for a key frame or RAP. The user terminal can simply switch once the first packet of the new stream is received. In this case, one would use the Start-Position-Type value Instant.

Figure 5:
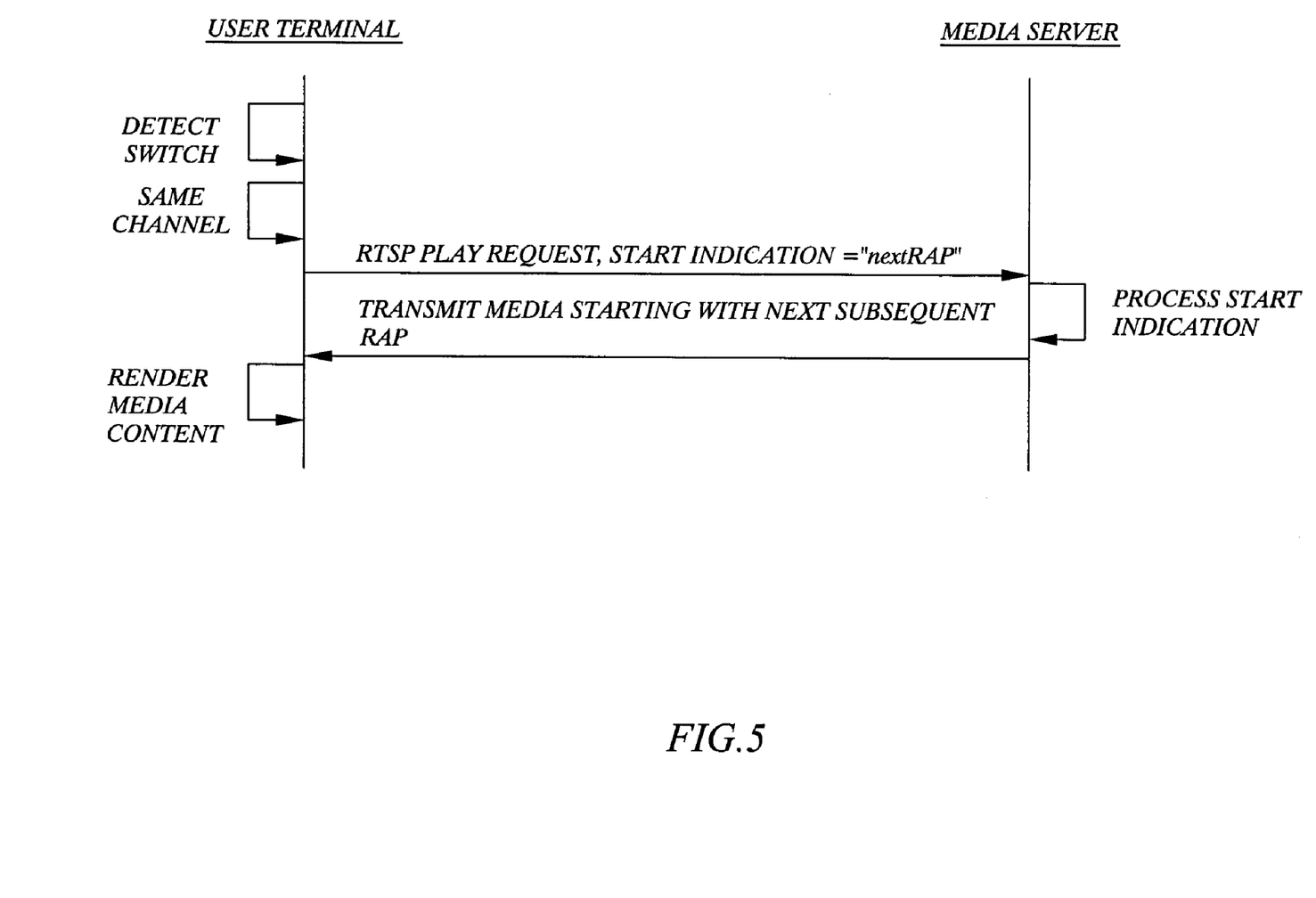
FIG. 5 illustrates a schematic signaling diagram of a further embodiment of a method according to the invention.

A signalling diagram illustrative of the above situation is shown in FIG. 5. The user terminal detects a channel switch and determines the switching type, in this case the channel is the same but the transport source changes from broadcast to unicast. Thus the user terminal transmits an RTSP PLAY request to the media server. The request includes a Start-Position-Type parameter with a value indicative of "nextRAP", thus requesting a non-buffered unicast media stream. At the media server the request and its indication is processed and the media server transmits the media stream starting with a next subsequent un-buffered RAP. Finally, the media content is rendered at the user terminal.

Channel Switch to Unicast, Different Channel

For the case of a simultaneous switch from one channel on broadcast to another channel on unicast it is necessary to receive a key frame to start viewing the channel. Consequently the client terminal requests transmission of the new channel, starting with the most recently buffered key frame. Thus, sets the Start-Position-Type parameter to "lastRAP"

Figure 6:
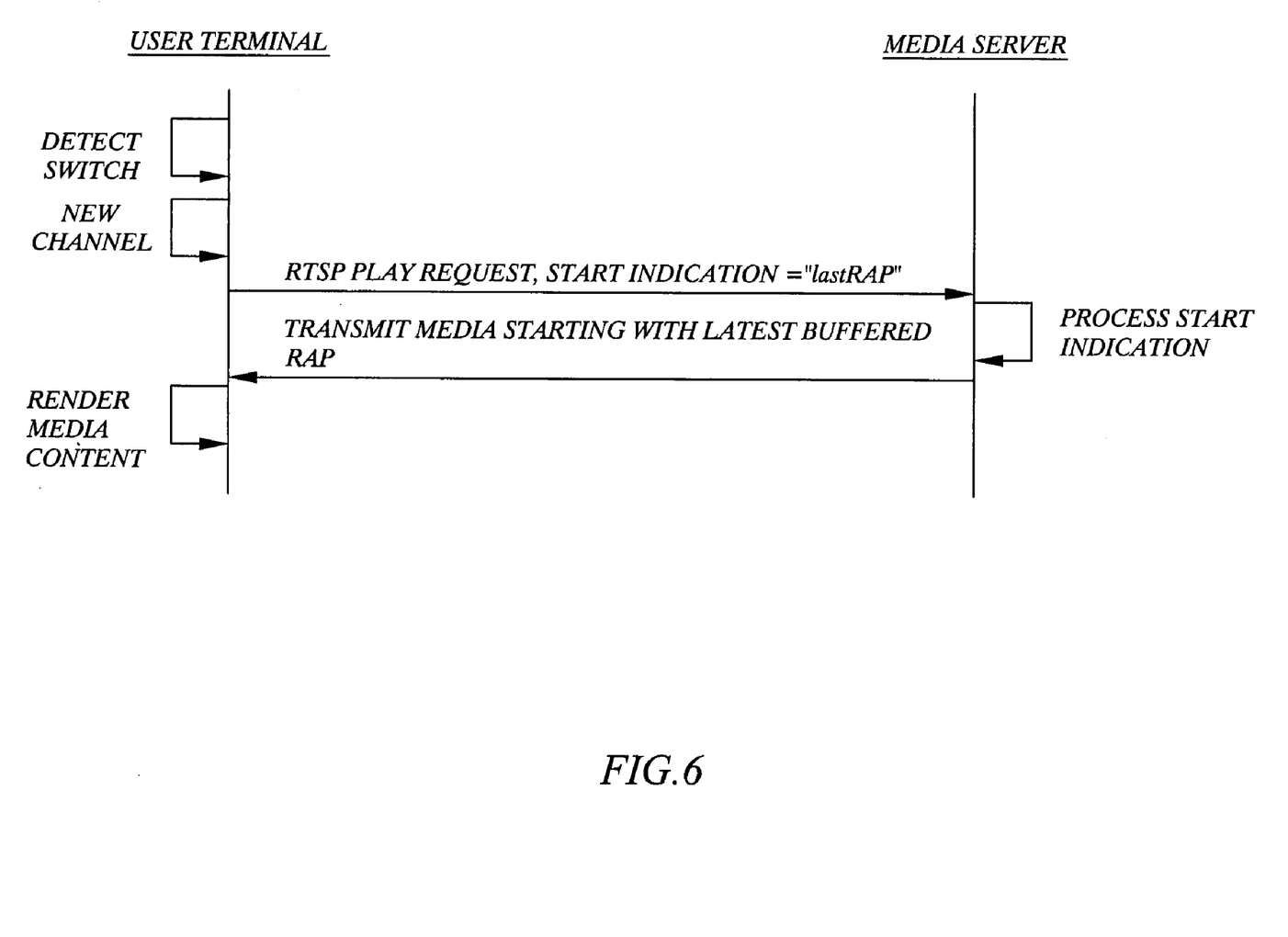
FIG. 6 illustrates a schematic signaling diagram of yet another embodiment of a method according to the invention.

A signaling diagram illustrative of the above situation is shown in FIG. 6. The user terminal detects a channel switch and determines the switching type, in this case the channel is the new and the transport source changes from broadcast to unicast. Thus the user terminal transmits an RTSP PLAY request to the media server. The request includes a Start-Position-Type parameter with a value indicative of "lastRAP", thus requesting a buffered unicast media stream. At the media server the request and its indication is processed and the media server transmits the media stream starting with a most recently buffered RAP. Finally, the media content is rendered at the user terminal.

Example Usage (Server)

In order for the method of the present invention to actually provide the desired results, the media provider or server needs to be configured to be able to interpret and respond to the incoming starting frame indication in the transmission request.

When the server receives a Start-Position-Type parameter set to "instant" it immediately transmits its live media stream.

When the server receives a Start-Position-Type parameter set to "lastRAP" it buffers key frames or RAP:s and succeeding packets of all channels to enable a fast switch. On reception of such a command, the server starts sending data starting at the most recently buffered key frame. It must also synchronize the media and start sending all of them.

Finally, when the server receives a Start-Position-Type parameter set to "nextRAP", it simply starts sending non-buffered data to the client once it receives the next key frame.

One further embodiment of a method according to the invention could be to instead of the client terminal indicating a desired starting frame; it could simply state a desired timestamp. The start time could be specified using NTP time, a timestamp, or other time, possibly taking into account network delay. If the server has data buffered corresponding to the requested timestamp, it could start transmitting from that data.

In order to reduce the variation in any FEC induced transport delay, potentially all channels can be delayed.

Figure 7:
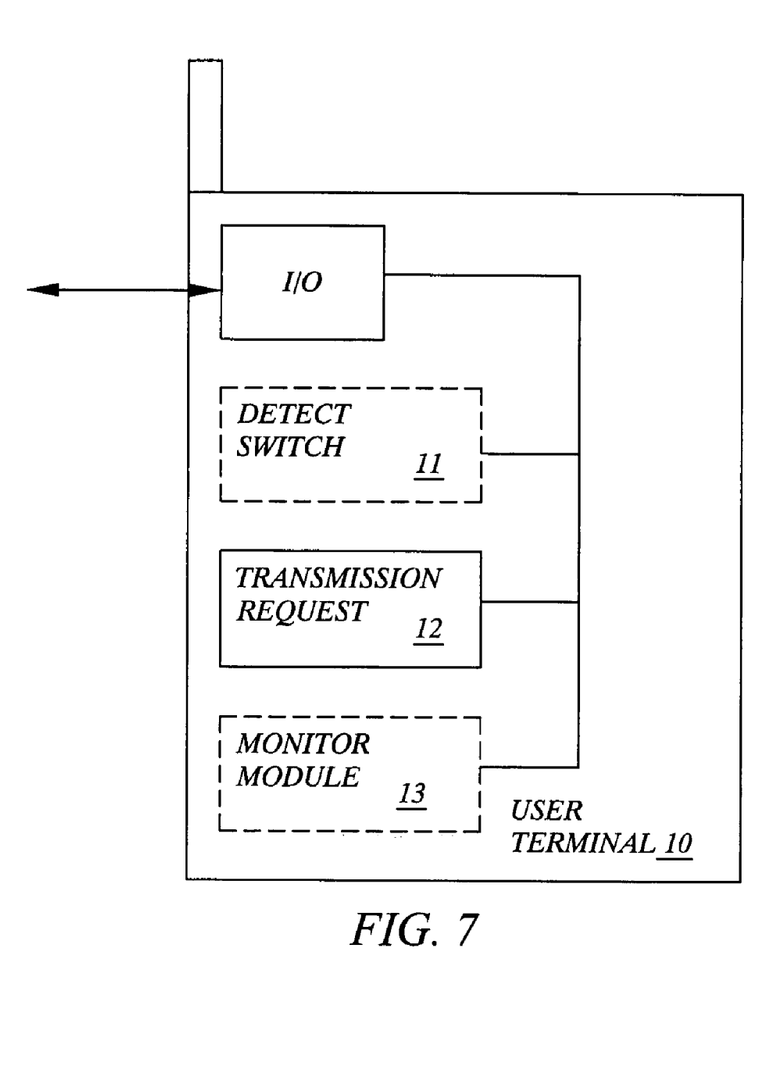
FIG. 7 illustrates an embodiment of a user terminal according to the invention.

A node e.g. client or user terminal according to the present invention will be described with reference to FIG. 7.

The user terminal 10 potentially comprises an optional unit 11 for detecting a necessary or optional channel switch. Further the terminal 10 includes a unit 12 for requesting transmission of a media stream from a unicast transport source or server. According to a particular embodiment the request unit 12 is configured for providing a request indicating a starting frame for the transmission. The request can be comprised in a message such as RSTP PLAY or some other protocol specific request with similar functionality.

In addition the terminal comprises all units necessary for receiving and viewing the requested media stream.

Optionally or additionally, a monitoring unit 13 can be provided as an external system module (or an internal unit in the client) monitoring the transmission conditions and providing information concerning necessary switching to the detecting unit 11. This monitoring module 13 could also be configured to receive feedback information from the user terminal.

Figure 8:
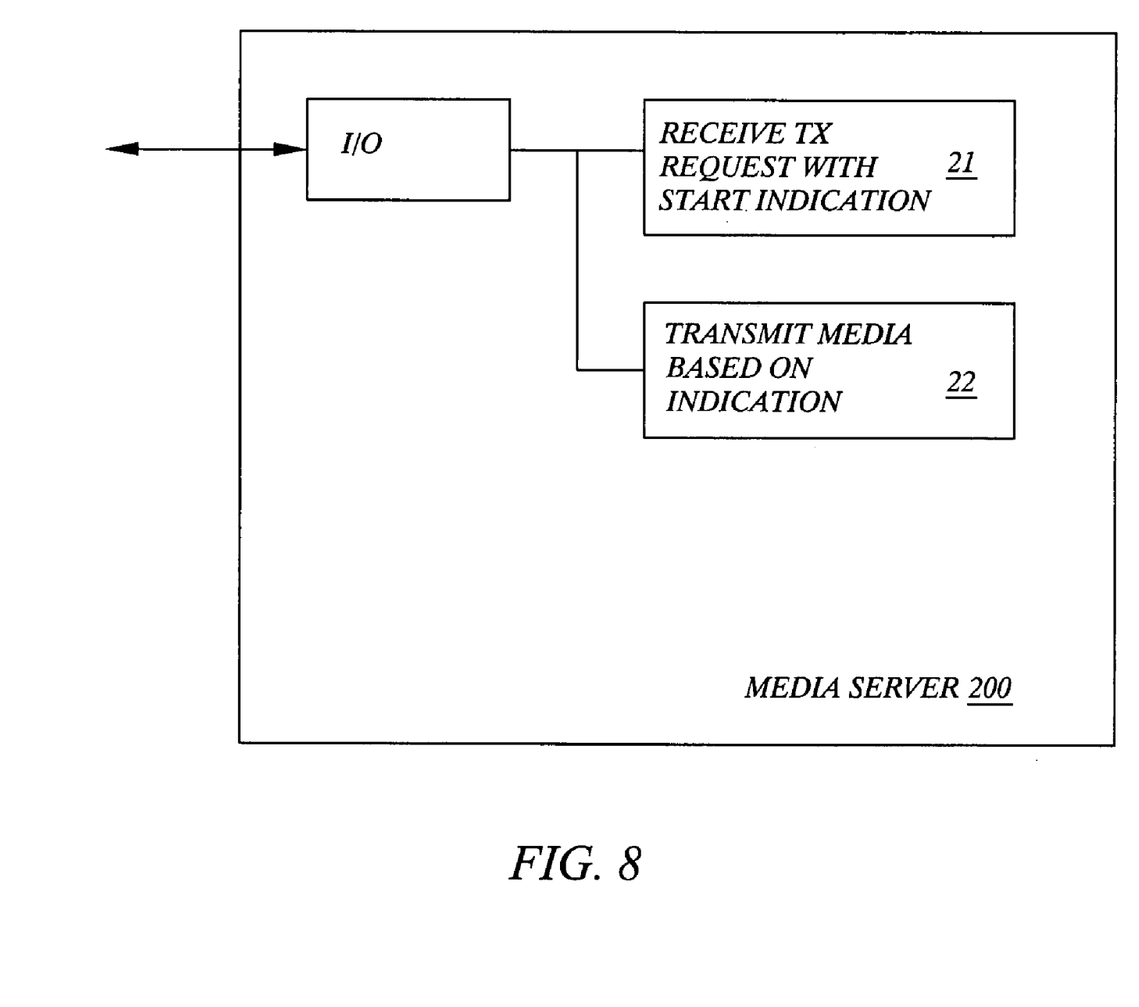
FIG. 8 illustrates an embodiment of a media server according to the invention.

A media transport server or source according to the present invention will be described with reference to FIG. 8.

The media server 200 comprises a unit 21 for receiving requests for transmission of media streams from a client terminal. Further, the server 200 comprises a unit 22 for transmitting the media stream with a predetermined starting frame based on an indication in the received request.

Advantages of the present invention include:

A user perceived seamless transition between a broadcast and unicast session.

Enabling a client to signal to a server where it wishes to start in a live unicast media stream.

An RTSP server can combine fast unicast channel switching with seamless broadcast to unicast transistion or other access transition. This can be done on a server where each channel is encoded only once and the fast switching is performed using buffering.

The embodiment of the present invention where the indication of a starting frame is indicated by means of a new header in an existing message, enables servers that do not have the invention implemented to simply ignore the header. Thereby, the present invention provides a solution that does not have any backward compatibility issues.

Although the present invention has been discussed mainly in relation to channel switching between a broadcast to a unicast media transport source, it is equally applicable (with minor modifications) to a situation where an entirely new unicast session is set up. Similarly, the present invention can be applied in a situation where a channel switch takes place within a unicast session.

It will be understood by those skilled in the art that various modifications and changes may be made to the present invention without departure from the scope thereof, which is defined by the appended claims.

REFERENCES

[1] 3GPP TS 26.346 "Multimedia Broadcast/Multicast Service (MBMS); Protocols and Codecs
[2] ETSI EN 302 304 V1.1.1 "Digital Video Broadcasting (DVB); Transmission System for Handheld Terminals (DVB-H)"
[3] IETF RFC2326, "Real-Time Streaming Protocol (RTSP)"
[4] 3GPP TS 26-234 "Transparent end-to-end Packet-switched Streaming Service (PSS); Protocols and Codecs

The invention claimed is:

1. A method of managing media sessions in a communication system, wherein at least one user terminal is capable of requesting transmission of at least one media stream from a unicast media source, said method comprising:
   said user terminal detecting a channel switch and determining a switch type for said detected switch;
   said user terminal requesting transmission of said at least one media stream by providing an indication of a predetermined starting frame for the transmission, wherein said indication is based on said determined switch type; and
   said unicast source transmitting said at least one media stream based on said indication.

2. The method of claim 1, wherein requesting said transmission in response to said determined switch type comprises said user terminal switching from a channel associated with a broadcast media source to a channel on said unicast media source.

3. The method of claim 2, wherein said broadcast channel and said unicast channel are the same channel.

4. The method of claim 3, wherein said requesting comprises requesting immediate transmission of non-buffered media frames of said media stream.

5. The method of claim 3, wherein said requesting comprises requesting transmission of non-buffered media frames of said media stream starting with a next self-contained media frame.

6. The method of claim 2, wherein said broadcast channel and said unicast channel are different channels.

7. The method of claim 6, wherein said requesting comprises requesting immediate transmission of buffered media frames of said media stream starting from a latest buffered self contained media frame.

8. The method of claim 6, wherein said self contained frame is an intraframe, key frame or random access point.

9. The method of claim 8, further comprising including a header in said request.

10. The method of claim 9, wherein said indication comprises a parameter value in said header.

11. The method of claim 1, wherein requesting said transmission in response to said determined switch type comprises initializing a new media session with the unicast media source.

12. The method of claim 1, wherein said requesting comprises requesting transmission of said media stream starting with a media frame with a predetermined timestamp.

13. The method of claim 1, wherein said requesting comprises including a request in a RTSP PLAY request.

14. A user terminal in a communication system, wherein said user terminal is capable of requesting transmission of at least one media stream from a unicast media source, said user terminal comprising:
   a detection unit for detecting a channel switch and determining a switch type; and
   a requesting unit for requesting transmission of said at least one media stream by providing an indication of a predetermined starting frame for the transmission, wherein said indication is based on said determined switch type.

15. The user terminal of claim 14, wherein said requesting unit is configured to request said transmission in response to said determined switch type based on said user terminal switching from a channel associated with a broadcast media source to a channel on said unicast media source.

16. The user terminal of claim 15, wherein said broadcast channel and said unicast channel are different channels.

17. The user terminal of claim 16, wherein said requesting unit is configured to request immediate transmission of buffered media frames of said media stream starting from a latest buffered self contained media frame.

18. The user terminal of claim 15, wherein said broadcast channel and said unicast channel are the same channel.

19. The user terminal of claim 18, wherein said requesting unit is configured to request immediate transmission of non-buffered media frames of said media stream.

20. The user terminal of claim 18, wherein said requesting unit is configured to request transmission of non-buffered media frames of said media stream starting with a next self-contained media frame.

21. The user terminal of claim 14, wherein said requesting unit is configured to request said transmission in response to said determined switch type based on initializing a new media session with the unicast media source.

22. The user terminal of claim 14, wherein said requesting unit is configured to request transmission of said media stream starting with a media frame with a predetermined timestamp.

23. A unicast media source in a communication system, wherein at least one user terminal supported by the communication system is capable of requesting transmission of at least one media stream from a unicast media source, said unicast media source comprising:
   a receiving unit for receiving said request from the at least one user terminal for transmission of said at least one media stream, said request comprising an indication of a predetermined starting frame for the transmission, wherein said indication is based on a determined switch type; and
   a transmitting unit for transmitting said at least one media stream to said at least one user terminal starting with a media frame for said media stream based on said processed indication.

24. The unicast media source of claim 23, wherein said transmitting unit is configured to immediately transmit buffered media frames of said media stream starting from a latest buffered self contained media frame.

25. The unicast media source of claim 23, wherein said transmitting unit is configured to immediately transmit non-buffered media frames of said media stream.

26. The unicast media source of claim 23, wherein said transmitting unit is configured to transmit non-buffered media frames of said media stream starting with a next self-contained media frame.

27. The unicast media source of claim 23, wherein said transmitting unit is configured to transmit said media stream starting with a media frame with a predetermined timestamp.

* * * * *

UNITED STATES PATENT AND TRADEMARK OFFICE
CERTIFICATE OF CORRECTION

| | | |
|---|---|---|
| PATENT NO. | : 8,340,113 B2 | Page 1 of 1 |
| APPLICATION NO. | : 12/665594 | |
| DATED | : December 25, 2012 | |
| INVENTOR(S) | : Einarsson et al. | |

It is certified that error appears in the above-identified patent and that said Letters Patent is hereby corrected as shown below:

On the Title Page, in Item [75] under "Inventors", in Column 1, Line 1, delete "Torbjorn" and insert
-- Torbjörn --, therefor.

On the Title Page, in Item [75] under "Inventors", in Column 1, Line 2, delete "Vasby" and insert
-- Väsby --, therefor.

On the Title Page, in Item [73] under "Assignee", in Column 1, Line 1, delete "Erricsson" and insert
-- Ericsson --, therefor.

On the Title Page, in the Figure, for Tag S00, Line 1, delete "DETERMIN" and insert
-- DETERMINE --, therefor.

In the Drawings

Figure 3:
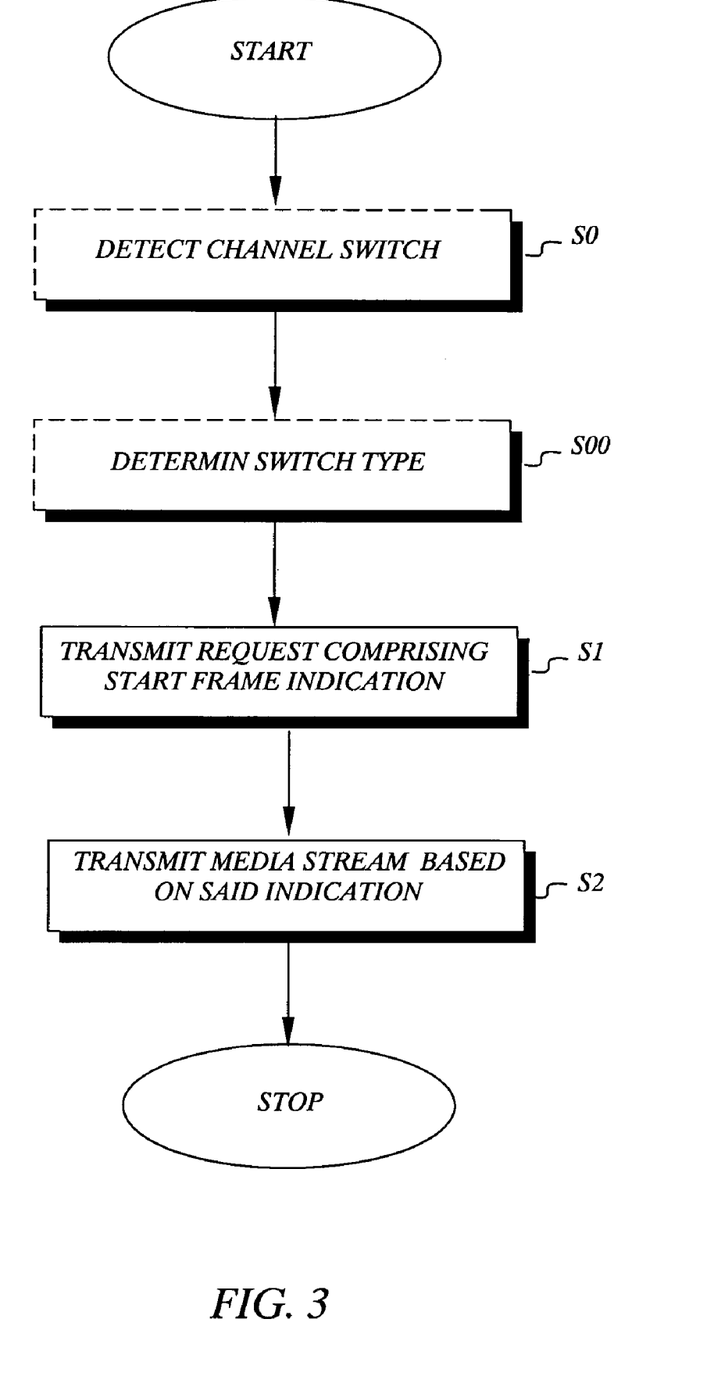
FIG. 3 illustrates an embodiment of a method according to the invention.

Fig. 3, Drawing Sheet 3 of 8, for Tag "S00", in Line 1, delete "DETERMIN" and insert
-- DETERMINE --, therefor.

In the Specification

Column 3, Line 40, delete "invention;" and insert -- invention; and --, therefor.

Column 7, Line 14, delete "Instant." and insert -- instant. --, therefor.

Column 7, Line 53, delete "RAP:s" and insert -- RAPs --, therefor.

Column 8, Line 12, delete "RSTP" and insert -- RTSP --, therefor.

Column 8, Line 36, delete "transistion" and insert -- transition --, therefor.

Signed and Sealed this
Sixteenth Day of September, 2014

Michelle K. Lee
*Deputy Director of the United States Patent and Trademark Office*